US012627918B2

(12) United States Patent
Wang et al.

(10) Patent No.: US 12,627,918 B2
(45) Date of Patent: May 12, 2026

(54) ELECTRONIC DEVICE

(71) Applicant: Advanced Semiconductor Engineering, Inc., Kaohsiung (TW)

(72) Inventors: Kai Hung Wang, Taipei City (TW); Kuei-Hao Tseng, New Taipei City (TW); Chih Lung Lin, Taipei City (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 312 days.

(21) Appl. No.: 18/241,206

(22) Filed: Aug. 31, 2023

(65) Prior Publication Data

US 2025/0080895 A1 Mar. 6, 2025

(51) Int. Cl.
*H04R 1/10* (2006.01)

(52) U.S. Cl.
CPC ......... *H04R 1/1016* (2013.01); *H04R 1/1041* (2013.01); *H04R 1/1083* (2013.01); *H04R 2460/15* (2013.01)

(58) Field of Classification Search
CPC . A61B 5/7225; A61F 13/01008; G06F 3/044; H04L 65/1059; H04M 1/23; H04R 1/1016; H04R 1/1041; H04R 1/105; H04R 1/1058; H04R 1/1075; H04R 1/1083; H04R 1/326; H04R 5/04; H04R 9/045; H04R 25/43; H04R 2201/10; H04R 2460/15; H04R 1/2849; A45C 11/00; A61N 1/205; B33Y 80/00; H01M 50/293
See application file for complete search history.

(56) References Cited

U.S. PATENT DOCUMENTS 8,503,688 B2 * 8/2013 DiRusso ................ H04R 1/105 381/189
11,259,111 B2 * 2/2022 Silvestri ............... H04R 1/2849
11,678,102 B2 * 6/2023 Li ........................ H04R 1/1075 381/74
11,706,555 B2 * 7/2023 Sun ..................... H04L 65/1059 381/74
11,792,575 B1 * 10/2023 Chen ...................... H04R 9/045 381/396
11,924,601 B2 * 3/2024 Oommen ............. H04R 25/656
11,979,703 B2 * 5/2024 McIntosh .............. E05F 1/1261
2007/0036376 A1 * 2/2007 Fried ...................... H04R 1/105 381/312
2009/0132093 A1 * 5/2009 Arneson ................. H04M 1/23 700/282
2012/0063622 A1 * 3/2012 Bruckhoff ............ H04R 1/1016 381/328
2012/0163617 A1 * 6/2012 Silvestri ............... H04R 1/1016 381/74
2013/0019374 A1 * 1/2013 Schwartz .......... A61F 13/01008 428/492

(Continued)

FOREIGN PATENT DOCUMENTS

CN 204993110 U 1/2016
CN 112272343 B 2/2023

*Primary Examiner* — Gerald Gauthier
(74) *Attorney, Agent, or Firm* — Foley & Lardner LLP

(57) ABSTRACT

The present disclosure provides an electronic device. The electronic device includes a flexible element and a deformable element configured to convert energy from one form to make the flexible element compliant with a user's skin.

3 Claims, 15 Drawing Sheets

(56) References Cited

U.S. PATENT DOCUMENTS

| | | | | |
|---|---|---|---|---|
| 2013/0083496 | A1* | 4/2013 | Franklin | G06F 3/044 361/752 |
| 2013/0142378 | A1* | 6/2013 | Bravo Cordero | H04R 1/105 381/380 |
| 2015/0139474 | A1* | 5/2015 | Henry | H04R 1/1016 381/380 |
| 2015/0257925 | A1* | 9/2015 | Schwartz | A61F 5/00 128/831 |
| 2016/0029117 | A1* | 1/2016 | Suvanto | H04R 1/326 381/337 |
| 2016/0192050 | A1* | 6/2016 | Masaki | H04R 1/1058 381/74 |
| 2017/0078785 | A1* | 3/2017 | Qian | H04R 5/04 |
| 2017/0305040 | A1* | 10/2017 | Schreiner | B33Y 80/00 |
| 2019/0191254 | A1* | 6/2019 | Pedersen | H04R 25/43 |
| 2020/0213707 | A1* | 7/2020 | Manley | H04R 1/1058 |
| 2021/0076118 | A1* | 3/2021 | Struzik | H04R 1/105 |
| 2021/0402174 | A1* | 12/2021 | Ireland | A61N 1/205 |
| 2022/0070571 | A1* | 3/2022 | Oommen | H04R 1/1058 |
| 2023/0088030 | A1* | 3/2023 | McIntosh | A45C 11/00 381/74 |
| 2025/0080894 | A1* | 3/2025 | Tseng | H04R 1/1016 |
| 2025/0080895 | A1* | 3/2025 | Wang | H04R 1/1016 |
| 2025/0204854 | A1* | 6/2025 | Lin | A61B 5/7225 |

* cited by examiner

11

11

ELECTRONIC DEVICE

BACKGROUND

1. Technical Field

The present disclosure relates to an electronic device.

2. Description of the Related Art

To enable an electronic device (such as an in-ear audio device or an intra-aural audio device) to be used with ears of different sizes and shapes, one solution is to provide a range of ear tips of different shapes and/or sizes from which the user can choose. Despite the known solutions, there is still a need for providing a proper fit with a user's ear to achieve optimal active noise cancellation (ANC) and enhance acoustic performance while ensuring comfort when the electronic device is worn.

SUMMARY

In some arrangements, an electronic device includes a flexible element and a deformable element configured to convert energy from one form to make the flexible element compliant with a user's skin.

In some arrangements, an electronic device includes an ear interface portion and a deformable element at least partially disposed in the ear interface portion. The deformable element is configured to deform the ear interface portion to compliant with a user's ear canal.

In some arrangements, an electronic device includes a deformable element configured to generate a first signal to an electronic component, to receive a second signal from the electronic component, and to deform an ear interface portion of the electronic device based on the second signal.

BRIEF DESCRIPTION OF THE DRAWINGS

Aspects of some arrangements of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
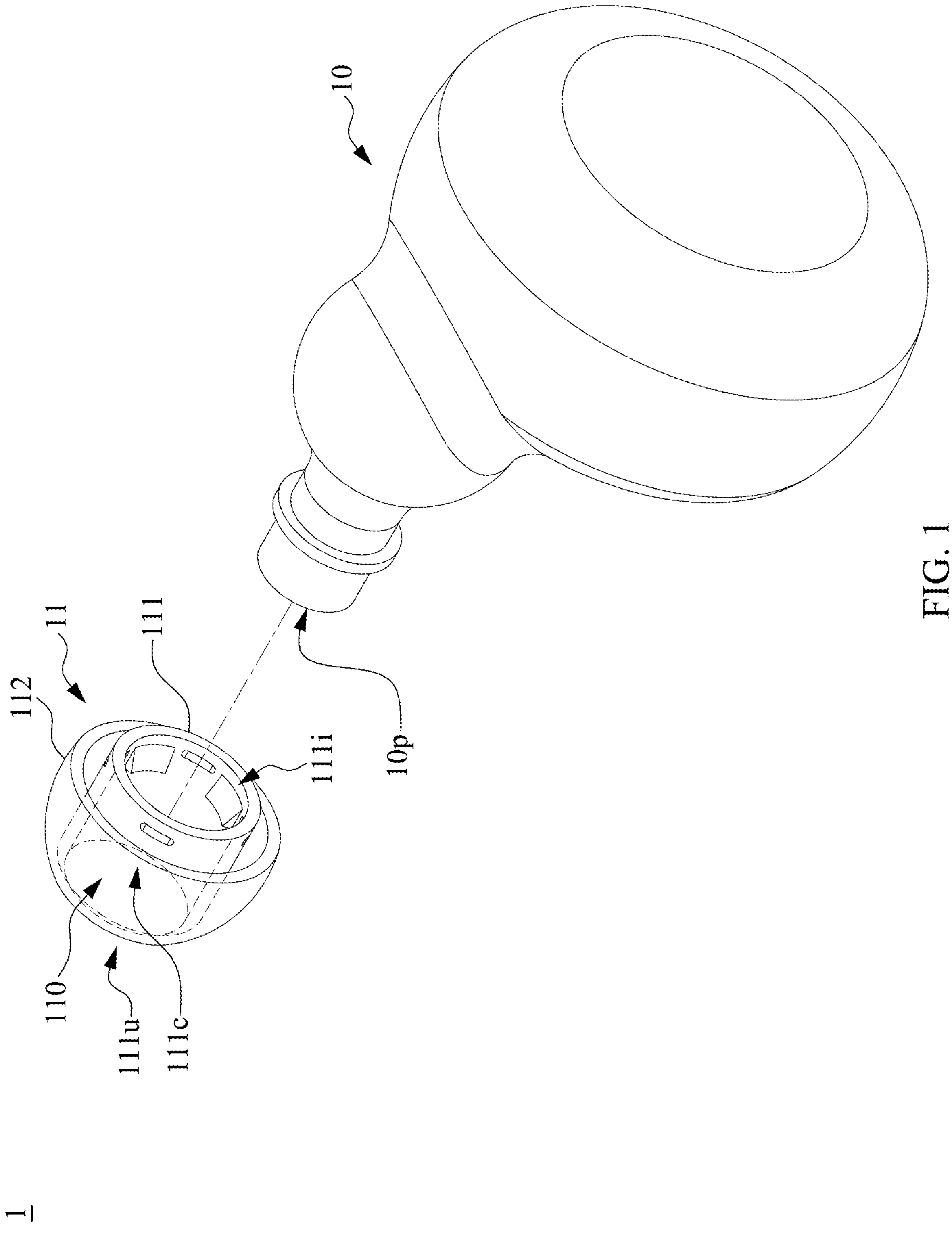
FIG. 1 illustrates a perspective view of an electronic device in accordance with some arrangements of the present disclosure.

The following disclosure provides for many different arrangements, or examples, for implementing different features of the provided subject matter. Specific examples of components and arrangements are described as follows to explain certain aspects of the present disclosure. These are, of course, merely examples and are not intended to be limiting. For example, the formation of a first feature over or on a second feature in the description that follows may include an arrangement in which the first and second features are formed or disposed in direct contact, and may also include an arrangement in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various arrangements and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of an arrangement of this disclosure are not deviated from by such arrangement.

The following description involves an electronic device and a wearable device.

FIG. 1 illustrates a perspective view of an electronic device 1 in accordance with some arrangements of the present disclosure. The electronic device 1 may include an acoustic device for amplifying, outputting, or transmitting audio signals (or sound waves), a wearable device, and/or a wearable acoustic device. The electronic device 1 may be configured to output audio signals to and/or input audio signals from a user. The electronic device 1 may be configured to output audio signals to and/or input audio signals from the surrounding environment.

The electronic device 1 may include one of a pair of electronic devices configured to fit in the left and right ears of a user. The electronic devices may include a hearing device, a hearing aid, a hearing protection device, an ear-piece, an earbud, or a device that may occlude the user's ear canal. The electronic devices may include an in-ear audio device or an intra-aural audio device. Application or usage of the electronic device 1 in the figures is for illustrative purposes only, and not intended to limit the present disclosure. For example, the electronic device may include a wearable device having a flexible portion configured to contact or seal against a part of a user's skin.

The electronic device 1 may include a housing 10 and an ear tip 11 that may attach to the housing 10. The housing 10 may enclose electronic components that operate the electronic device 1 (e.g., a battery, a processor, a memory, an acoustic driver or source for generating audio signals, etc.). The housing 10 may include an opening 10*p* through which the generated audio signals can be outputted to the ear tip 11, which can then direct the audio signals into the user's ear canal. The ear tip 11 may include an attachment structure or mechanism that enables the ear tip 11 to be attached to the housing 10 or be removed from the housing 10.

The ear tip 11 may include a first portion (such as a body portion 111) and a second portion (such as an ear interface portion 112) disposed at least partially about the body portion 111. The ear interface portion 112 may at least partially cover the body portion 111.

The body portion 111 may be configured to removably attach to the housing 10. The body portion 111 may define or have an acoustic channel (which may also be referred to as an opening or a hole) 111*c* through which audio signals (or sound waves) pass. The body portion 111 may be configured to guide audio signals (or sound waves). The body portion 111 may include an acoustic input portion (which may also be referred to as an inlet) 111*i* configured to be disposed adjacent to the opening 10*p* of the housing 10. The generated audio signals from the opening 10*p* may be received or input through the acoustic input portion 111*i*. The body portion 111 may include an acoustic output portion (which may also be referred to as an outlet) 111*u* opposite to the acoustic input portion 111*i* and configured to be disposed into a user's ear canal when the electronic device 1 is worn by the user. The body portion 111 may include a cylindrical structure, an elliptic cylindrical structure, or a polygonal column or pillar.

Figure 6:
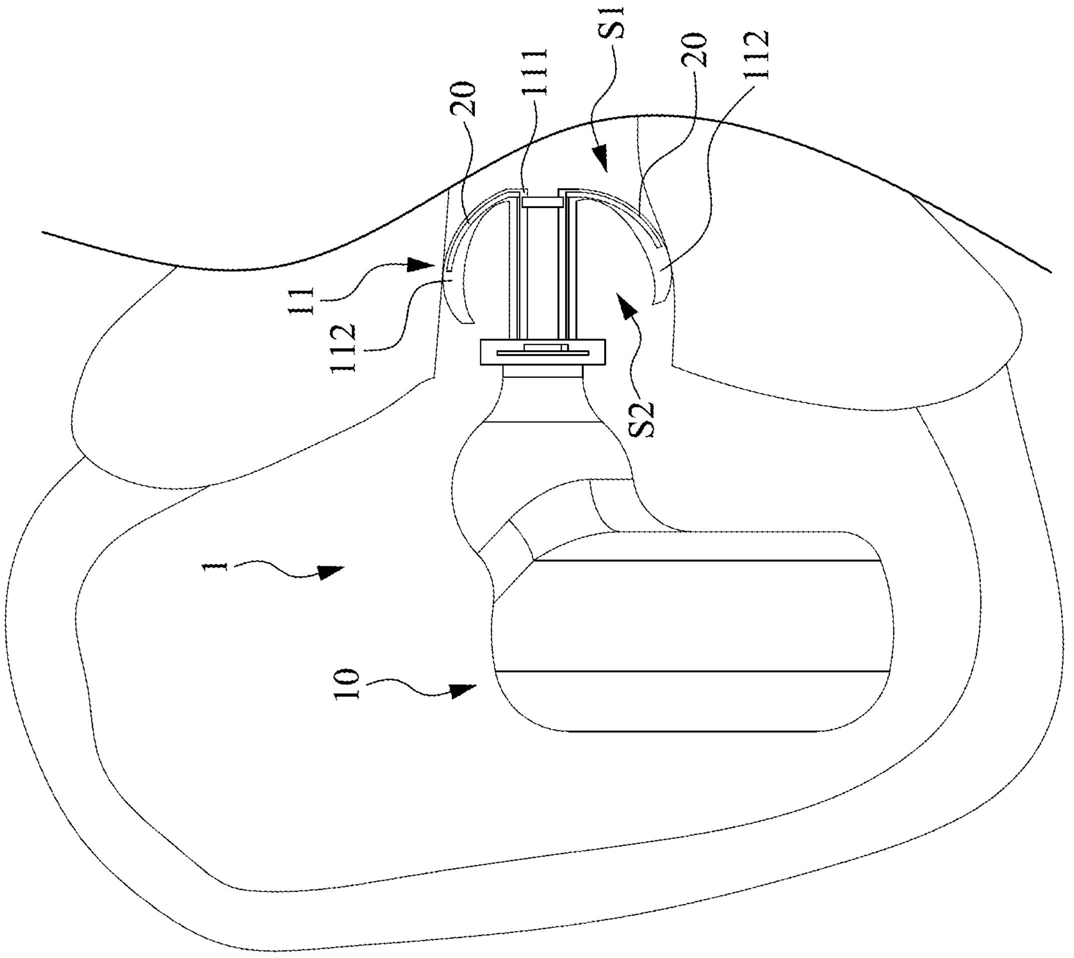
FIG. 6 illustrates a side view of an electronic device being worn on an ear in accordance with some arrangements of the present disclosure.

The ear interface portion 112 may form at least a partial seal with the user's ear canal when the electronic device 1 is worn by the user (as shown in FIG. 6). The ear interface portion 112 may be configured as a dome or may include a spherical structure. In other arrangements, the ear interface portion 112 may have other configurations, such as one or more radial fins.

In some arrangements, the body portion 111 and the ear interface portion 112 may be a single, monolithic structure. For example, the body portion 111 and the ear interface portion 112 may constitute an unassembled unitary member that may be formed in a molding or other operation. In some arrangements, the body portion 111 and the ear interface portion 112 may constitute an assembly of separate components. For example, the ear interface portion 112 may be adhered to at least a top end of the body portion 111 or the acoustic output portion 111*u*. The shapes and the configurations of the body portion 111 and the ear interface portion 112 are not intended to limit the present disclosure.

In some arrangements, the body portion 111 and the ear interface portion 112 may each include, for example, rubber, silicon, sponge, or other suitable materials. In some arrangements, the body portion 111 and the ear interface portion 112 may each include a liquid silicone rubber (LSR). The particular material used may depend on one or more factors including a desire for biocompatibility and oleophobic properties among other considerations and use case requirements.

In some arrangements, the body portion 111 and the ear interface portion 112 may each include a deformable element, an adjustable element, an elastic element, a soft element, and/or a flexible element. For example, the body portion 111 and the ear interface portion 112 may each be configured to be adjustable. For example, the body portion 111 and the ear interface portion 112 may each be soft and flexible enough for the user to wear comfortably for an extended time period. In some arrangements, the body portion 111 and the ear interface portion 112 may each be relatively more resistant to stress, impact, twisting or other physical or structural changes. For example, the body portion 111 and the ear interface portion 112 may each be resilient, such that, after being squeezed or deformed, it can return to its original state. In some arrangements, when the electronic device 1 is worn by a user, the ear interface portion 112 may be conformal to the user's ear canal. In some arrangements, the ear interface portion 112 may flexibly adjust its shape to conform to the user's ear canal.

In some arrangements, the body portion 111 and the ear interface portion 112 may include the same material. In some arrangements, the body portion 111 and the ear interface portion 112 may include different materials.

The ear tip 11 may include a cover 110 disposed adjacent to the acoustic output portion 111*u* of the body portion 111. The cover 110 may be acoustically transmissive. In order for the ear tip 11 to provide good quality audio, the acoustic channel 111*c* may remain substantially free of any foreign matter that may collect in the acoustic channel 111*c* by providing the cover 110. The cover 110 may be configured to substantially prevent foreign matter, such as human debris (e.g., ear wax), from entering into the acoustic channel 111*c*.

The cover 110 may include a mesh cover. For example, the cover 110 may include an interlaced structure or a mesh structure that allows the audio signals (or sound waves) or air waves to propagate. For example, the cover 110 may be formed of a network of wires, lines, or yarns. For example, the cover 110 may include a plurality of openings, apertures, holes, patterns, or paths. In some arrangements, the cover 110 may include textile, fabric, plastic, metal, metal alloy, carbon fiber, silicone, other suitable materials, or composite materials. In some arrangements, the cover 110 may include a multi-layered mesh structure. In some arrangements, from a top view (such as the top view of FIG. 2A), the outline of the cover 110 may be in the shape of a circle, oval, ellipse, square, triangle, polygon, etc. The plurality of openings of the cover 110 may be evenly or equally spaced. The plurality of openings of the cover 110 may be in the shape of a circle, oval, ellipse, square, triangle, polygon, etc.

Figure 2A:
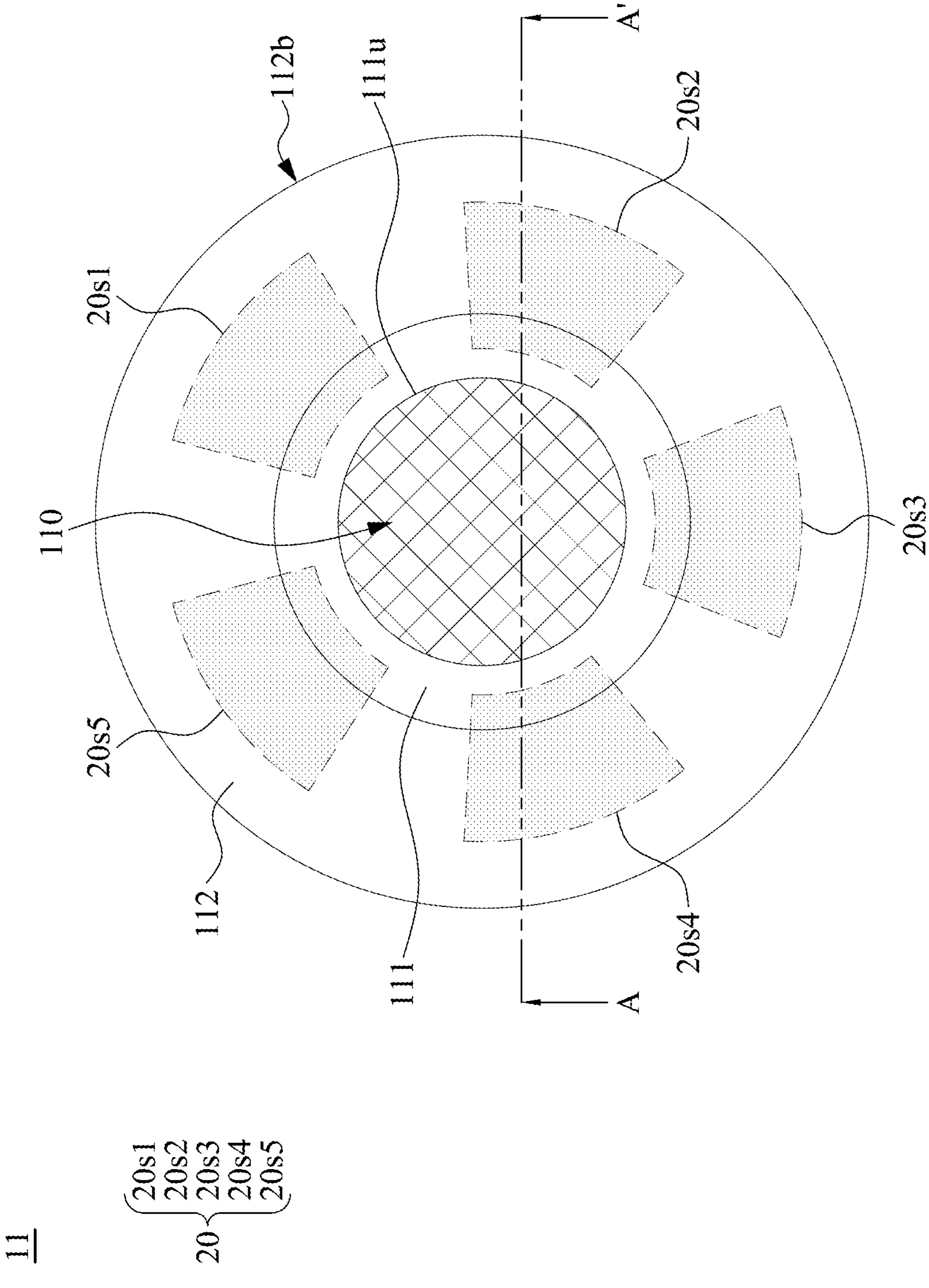
FIG. 2A illustrates a top view of an electronic device in accordance with some arrangements of the present disclosure.

FIG. 2A illustrates a top view of an electronic device in accordance with some arrangements of the present disclosure. In some arrangements, the ear tip 11 of the electronic device 1 in FIG. 1 may have a top view in FIG. 2A.

The ear tip 11 may include a deformable element 20. The deformable element 20 may be encapsulated, covered, embedded, and/or surrounded in the ear tip 11. The deformable element 20 may not be exposed from the ear tip 11. The dashed lines are illustrated to present a contour of the deformable element 20. The deformable element 20 may be disposed or located in the body portion 111 and the ear interface portion 112. The deformable element 20 may extend between the body portion 111 and the ear interface portion 112.

The deformable element 20 may surround or be disposed around the cover 110 and/or the body portion 111. The deformable element 20 may be disposed adjacent to the cover 110 and/or the body portion 111. For example, the cover 110 may be at least partially exposed from the acoustic output portion 111*u*, and the deformable element 20 may be disposed between the cover 110 and the outermost boundary (an outer edge or an outer margin) 112*b* of the ear interface portion 112. The deformable element 20 may be disposed along the outermost boundary 112*b* of the ear interface portion 112.

In some arrangements, the deformable element 20 may include a plurality of sections (or portions) 20*s*1, 20*s*2, 20*s*3, 20*s*4, and 20*s*5 collectively disposed along the outermost boundary 112*b* of the ear interface portion 112. The sections 20*s*1, 20*s*2, 20*s*3, 20*s*4, and 20*s*5 of the deformable element 20 are separated from one another.

The sections 20*s*1, 20*s*2, 20*s*3, 20*s*4, and 20*s*5 of the deformable element 20 may be symmetrically disposed with respect to a center of the cover 110. The sections 20*s*1, 20*s*2, 20*s*3, 20*s*4, and 20*s*5 of the deformable element 20 may be spaced apart from one another by ansubstantially equivalent distance.

The deformable element 20 may be deformed without experiencing cracking, breaking, or failure. The deformation of the deformable element 20 may include extension, compression, depression, projection, shear, bending, twisting, etc. For example, the size and/or the shape (or the dimension) of the deformable element 20 may be changed from a reference configuration to a current configuration. A configuration is defined as a set containing the positions of all the particles of the deformable element 20. The dimension may be a measurable extent (such as length, breadth, depth, or height), a form, or a shape.

The deformable element 20 may be deformed (e.g., exhibit a change in the size and/or the shape) by an external force (such as tensile, thrust, shear, bending or torsional), changes in an electric field (or a magnetic field or electromagnetic field), changes in temperature, changes in moisture content or chemical reactions, etc. In some arrangements, the deformation of the deformable element 20 may be controlled automatically or manually by a user after the electronic device 1 is manufactured.

In some arrangements, the deformable element 20 may include a transducing element or a transducer that may convert energy from one form to another. In some arrangements, the deformable element 20 may include a vibrotactile transducer. In some arrangements, the deformable element 20 may include a piezoelectric material that may exhibit a piezoelectric effect (to convert mechanical energy to electrical energy) and a reverse piezoelectric effect (to convert electrical energy to mechanical energy). For example, the deformable element 20 may be deformed when subjected to or stimulated by an electric field.

In some arrangements, the types, orientations, directions, and degrees of deformation of the deformable element 20 may be controlled by a magnitude and sign of a voltage applied across the deformable element 20.

In some arrangements, when the electronic device 1 is produced, one or more factors may be considered and predetermined to achieve a desired deformation of the deformable element 20 (and thus to provide active noise cancellation (ANC) and enhance acoustic performance). The one or more factors include the different materials of the body portion 111 (further described with respect to FIG. 4A), the different widths of the body portion 111 (further described with respect to FIG. 4B), the different materials of the deformable element 20 (further described with respect to FIG. 4C), and the different widths of the deformable element 20 (further described with respect to FIG. 4D).

Figure 2B:
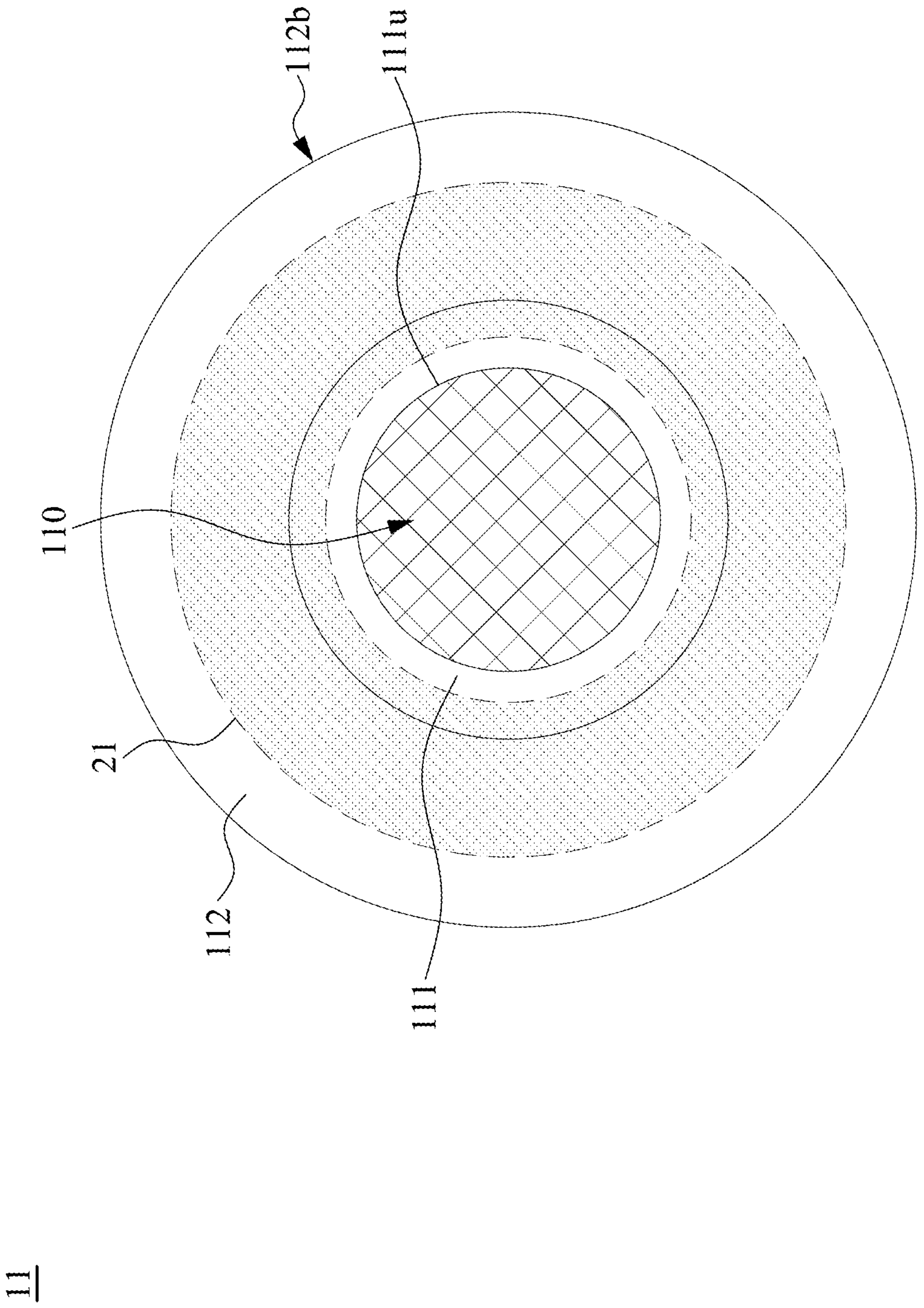
FIG. 2B illustrates a top view of an electronic device in accordance with some arrangements of the present disclosure.

FIG. 2B illustrates a top view of an electronic device in accordance with some arrangements of the present disclosure. In some arrangements, the ear tip 11 of the electronic device 1 in FIG. 1 may have a top view in FIG. 2B. The ear tip 11 in FIG. 2B is similar to the ear tip 11 in FIG. 2A except for the differences described as follows.

The ear tip 11 may include a deformable element 21. The deformable element 21 may include an annular structure. The deformable element 21 may be a single, monolithic structure. The deformable element 21 may be deformed in a geometrically symmetrical manner, and thus allow a geometrically symmetrical deformation of the ear interface portion 112.

Figure 3A:
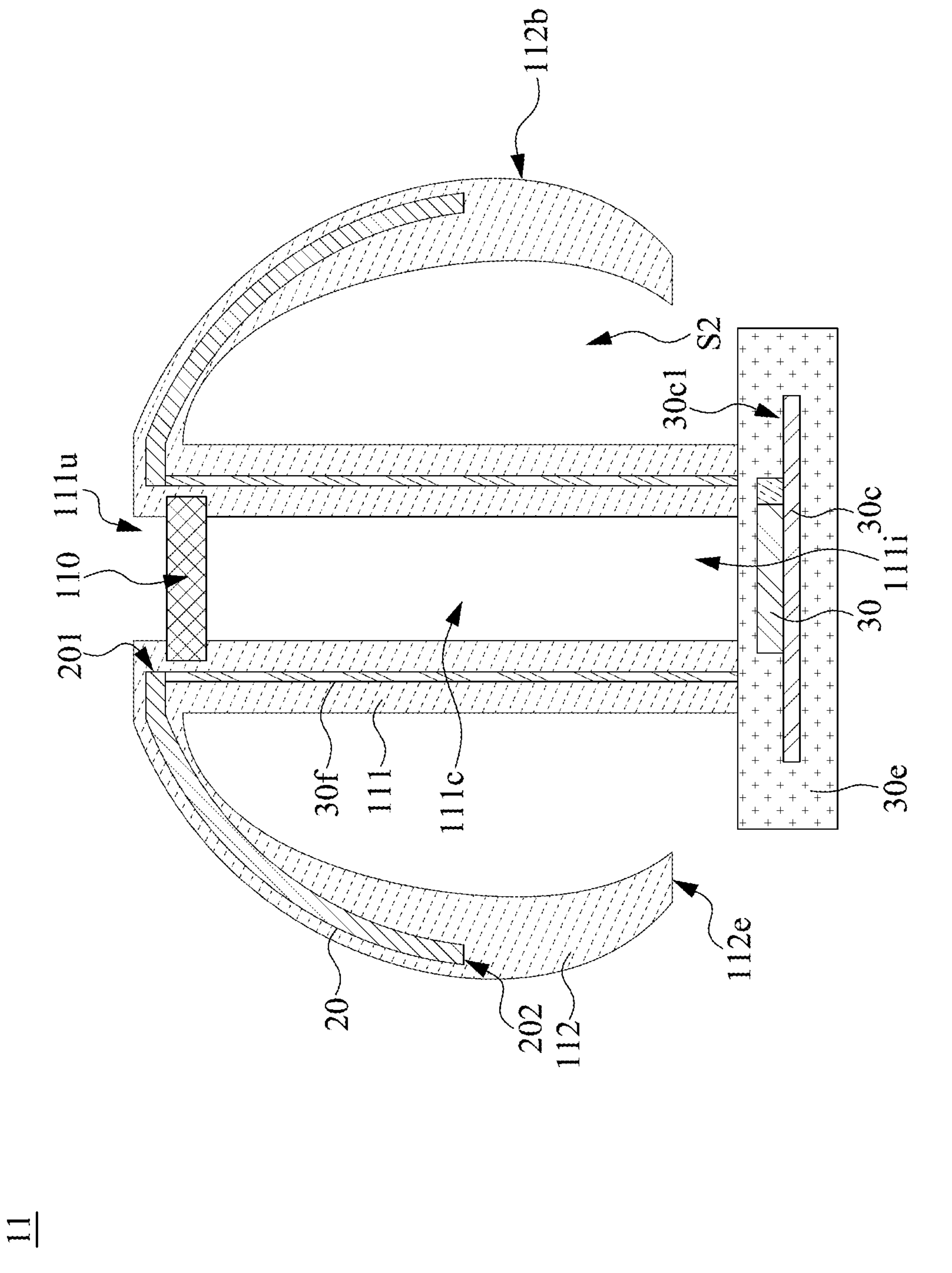
FIG. 3A illustrates a cross-sectional view of an electronic device in accordance with some arrangements of the present disclosure.

FIG. 3A illustrates a cross-sectional view of an electronic device in accordance with some arrangements of the present disclosure. In some arrangements, the ear tip 11 of the electronic device 1 in FIG. 1 may have a cross-sectional view in FIG. 3A. In some arrangements, the cross-sectional view in FIG. 3A may be a cross-sectional view of the ear tip 11 in FIG. 2A along the line AA'.

The ear interface portion 112 may extend from a top end of the body portion 111 or the acoustic output portion 111*u*. The ear interface portion 112 may be at least partially separated from the body portion 111. A space S2 between the ear interface portion 112 and the body portion 111 may be configured or may be reserved for deformation of the ear interface portion 112 (further described with respect to FIG. 6).

The deformable element 20 may extend along the ear interface portion 112. For example, the deformable element 20 may extend from the top end of the body portion 111 or the acoustic output portion 111*u* to (or toward) an end (or a tail end) 112*e* of the ear interface portion 112. An end 201 of the deformable element 20 may be closer to the acoustic output portion 111*u* and an end 202 (or an opposite end) of the deformable element 20 may be closer to the end 112*e* of the ear interface portion 112. The end 201 of the deformable element 20 may be covered by the body portion 111. The end 202 of the deformable element 20 may be covered by the ear interface portion 112. The end 202 of the deformable element 20 may extend to (or toward) the end 112*e* of the ear interface portion 112. In some arrangements, the deformable element 20 may not be disposed in the body portion 111. For example, the end 201 of the deformable element 20 may be spaced apart from the body portion 111 and covered by the ear interface portion 112.

The ear interface portion 112 may stick to the deformable element 20 such that the ear interface portion 112 may follow the movement of the deformable element 20. The ear interface portion 112 may stick to the deformable element 20 such that when the deformable element 20 is deformed (e.g., exhibits a change in the size and/or the shape), the size and/or the shape of the ear interface portion 112 may change along the deformable element 20.

In some arrangements, the deformable element 20 may be configured to receive a signal (which may include a controlling signal from an electronic component 30 or an instruction from a user) and deform (e.g., exhibit a change in the size and/or the shape) based on the signal. For example, the deformable element 20 may be configured to deform automatically or manually after being manufactured.

In some arrangements, the deformable element 20 may be configured to deform, move, force, or impel the ear interface portion 112 based on the signal. For example, the deformable element 20 may be configured to change a size, a shape, or both of the ear interface portion 112 based on the signal. For example, the deformable element 20 may be configured to make the ear interface portion 112 compliant with (or conform to, seal against) the user's ear canal based on the signal.

For example, the deformable element 20 may be configured to deform the ear interface portion 112 automatically or manually after being manufactured. For example, the deformable element 20 may be configured to make the ear interface portion 112 compliant with (or conform to, seal against) the user's ear canal automatically or manually after being manufactured.

In some arrangements, the ear tip 11 may include a user device to provide a manually-operable control of the deformable element 20. The user device may include any device capable of communicating via a network, such as a home network and/or an access network. The user device may include an interactive interface, such as a graphic user interface (GUI). Examples of the user device may include a mobile phone, a tablet, a personal computer, or another device that may provide an ability to selectively deform the deformable element 20. For example, the user device may provide a plurality of modes for the user to choose from.

In some arrangements, the ear tip 11 may include the electronic component 30. The electronic component 30 may include a system-in-package (SiP). In some arrangements, the electronic component 30 may include a control component (or a control unit), a data conversion component, a processing component, a storage component, a transmission component, or a combination thereof. In some arrangements, the electronic component 30 may include an analog-to-digital converter.

In some arrangements, the electronic component 30 may be configured to control the deformation of the deformable element 20. In some arrangements, the electronic component 30 may be configured to control the size and/or the shape of the deformable element 20. In some arrangements, the electronic component 30 may be configured to control the size and/or the shape of the ear interface portion 112 by deforming the deformable element 20.

For example, the electronic component 30 may be configured to provide a controlling signal (such as a voltage) to the deformable element 20 (which may include a piezoelectric material). The types (such as extension, compression, depression, projection, shear, bending, twisting, etc.), orientations, directions, and degrees of deformation of the deformable element 20 may be controlled by a magnitude and sign of the voltage applied across the deformable element 20 from the electronic component 30. In some arrangements, the electronic component 30 may be configured to control the deformation of the deformable element 20 automatically (further described with respect to FIG. 5A).

In some arrangements, the electronic component 30 may generate a controlling signal to the deformable element 20 (which may be a vibrotactile transducer) to produce an oscillatory motion (a periodic motion) for the deformable element 20 (and the ear interface portion 112) and provide an alarm or vibrational vibrotactile stimulation to a user. In some arrangements, the electronic component 30 may generate a controlling signal to the deformable element 20 to produce a non-periodic motion including, but not limited to, a deformation, such as extension, compression, depression, projection, shear, bending, twisting, etc.

In some arrangements, the electronic component 30 may be configured to control the vibration or the deformation of the deformable element 20 automatically. For example, the electronic component 30 may be configured to receive a signal from another detector, such as an incoming call on a mobile phone, a verbal or non-verbal command issued by a user, and/or an activity of a user. The activities of a user may include locomotion, such as motion of the user's head, motion of the user's eyes, and motion of the user's body.

The electronic component 30 may be disposed over a carrier 30*c*. The electronic component 30 may be electrically connected to one or more of other electrical components (if any), to the carrier 30*c*, and to the deformable element 20, and the electrical connections may be attained by way of flip-chip or wire-bond techniques. The carrier 30*c* may be, for example, a printed circuit board, such as a paper-based copper foil laminate, a composite copper foil laminate, or a polymer-impregnated glass-fiber-based copper foil laminate. In some arrangements, the carrier 30*c* may include an interconnection structure, such as a redistribution later (RDL), a grounding layer, and a feeding line. In some arrangements, the carrier 30*c* may include one or more conductive pads (not illustrated in the figures) in proximity to, adjacent to, or embedded in and exposed at a surface 30*cl* of the carrier 30*c*. The carrier 30*c* may include solder resists (or solder mask) (not illustrated in the figures) on the surface 30*c*1 of the carrier 30*c* to fully expose or to expose at least a portion of the conductive pads for electrical connections.

The electronic component 30 and the carrier 30*c* may be electrically connected to the deformable element 20 by a flexible connection element 30*f*. In some arrangements, the flexible connection element 30*f* may include an electrical connection element, such as a flexible printed circuit (FPC), a conductive wire, a redistribution layer (RDL), or a combination thereof. In some arrangements, the flexible connection element 30*f* may extend along the acoustic channel 111*c*. In some arrangements, the flexible connection element 30*f* may extend along the body portion 111. In some arrangements, the flexible connection element 30*f* may extend from the carrier 30*c* to the top end of the body portion 111 or the acoustic output portion 111*u*. In some arrangements, the flexible connection element 30*f* may contact or be connected to the end 201 of the deformable element 20.

The electronic component 30 may be covered by the encapsulation layer 30*e*. The encapsulation layer 30*e* may be disposed over the carrier 30*c* to encapsulate the electronic component 30. The encapsulation layer 30*e* may be disposed over opposite sides of the carrier 30*c*. The encapsulation layer 30*e* may surround edges of the electronic component 30 and may further cover an active surface and/or an inactive surface of the electronic component 30.

The encapsulation layer 30*e* may cover a portion of the flexible connection element 30*f*. The flexible connection element 30*f* may extend through the encapsulation layer 30*e* and the body portion 111 to connect to the deformable element 20. The encapsulation layer 30*e* may include an epoxy resin having fillers, a molding compound (e.g., an epoxy molding compound or another molding compound), a polyimide, a phenolic compound or material, a material with a silicone dispersed therein, or a combination thereof.

In some arrangements, the electronic component 30 may be integrated in the ear tip 11 (for example, through an insert molding process) to shorten the flexible connection element 30*f* and to reduce the transmission distance of the controlling signal from the electronic component 30 to the deformable element 20 through the flexible connection element 30*f*. For example, the electronic component 30 may be at least partially disposed in the body portion 111. For example, the electronic component 30 may be at least partially disposed in the ear interface portion 112. In some arrangements, the electronic component 30 may be integrated in an attachment structure or mechanism that enables the ear tip 11 to be attached to the housing 10 or be removed from the housing 10.

Figure 3B:
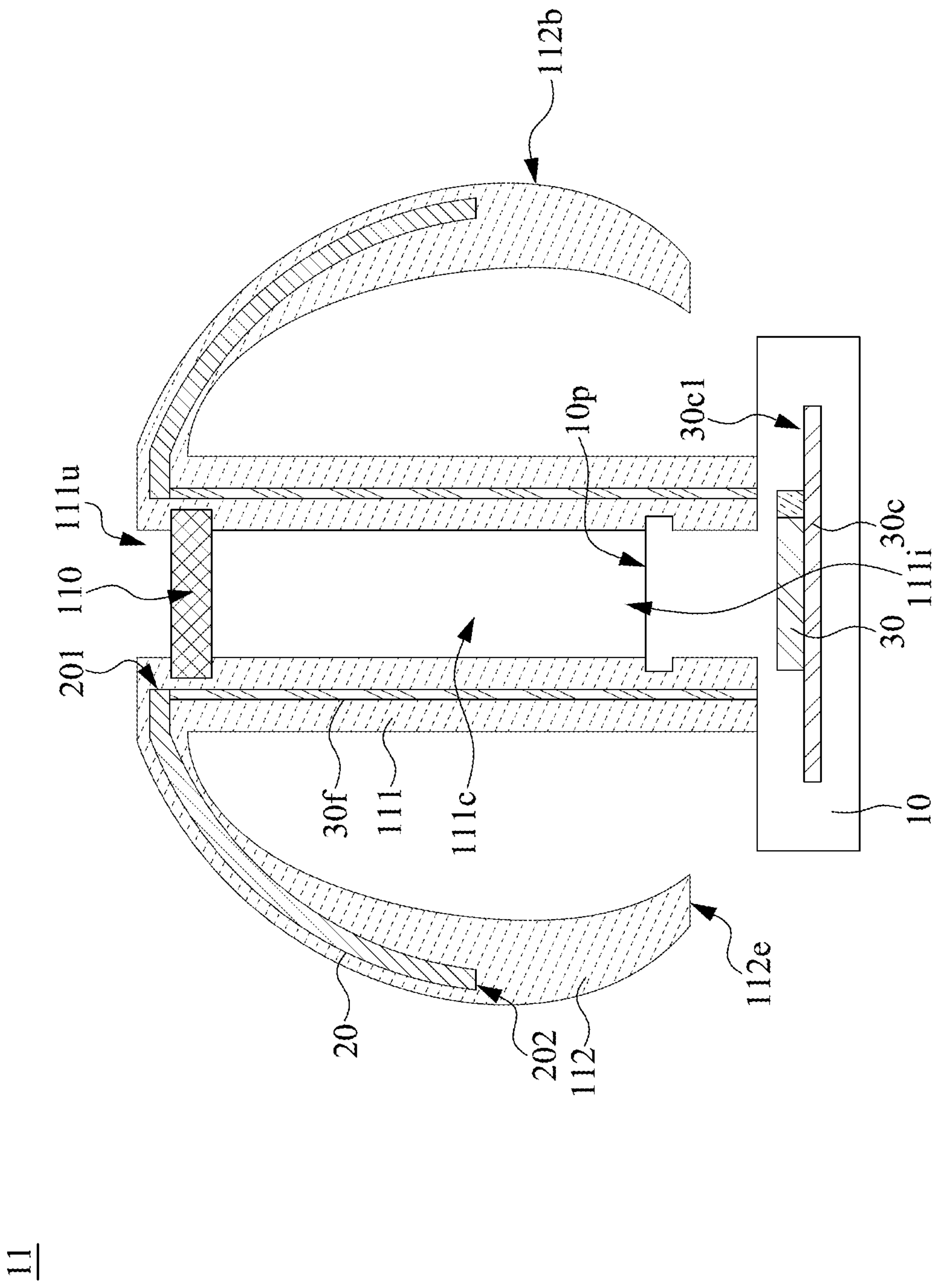
FIG. 3B illustrates a cross-sectional view of an electronic device in accordance with some arrangements of the present disclosure.

FIG. 3B illustrates a cross-sectional view of an electronic device in accordance with some arrangements of the present disclosure. The ear tip 11 in FIG. 3B is similar to the ear tip 11 in FIG. 3A except that the electronic component 30 and the carrier 30*c* may be disposed in the housing 10. The opening 10*p* through which the generated audio signals can be outputted is disposed in the acoustic channel 111*c*. By arranging the electronic component 30 and the carrier 30*c* in the housing 10, the electronic component 30 and the carrier 30*c* can be easily replaced and maintained.

The positions, functions, and number of the electronic component 30 in the electronic device 1 are not intended to limit the present disclosure. For example, there may be any number of electronic components in the electronic device 1 due to design requirements.

Figure 3C:
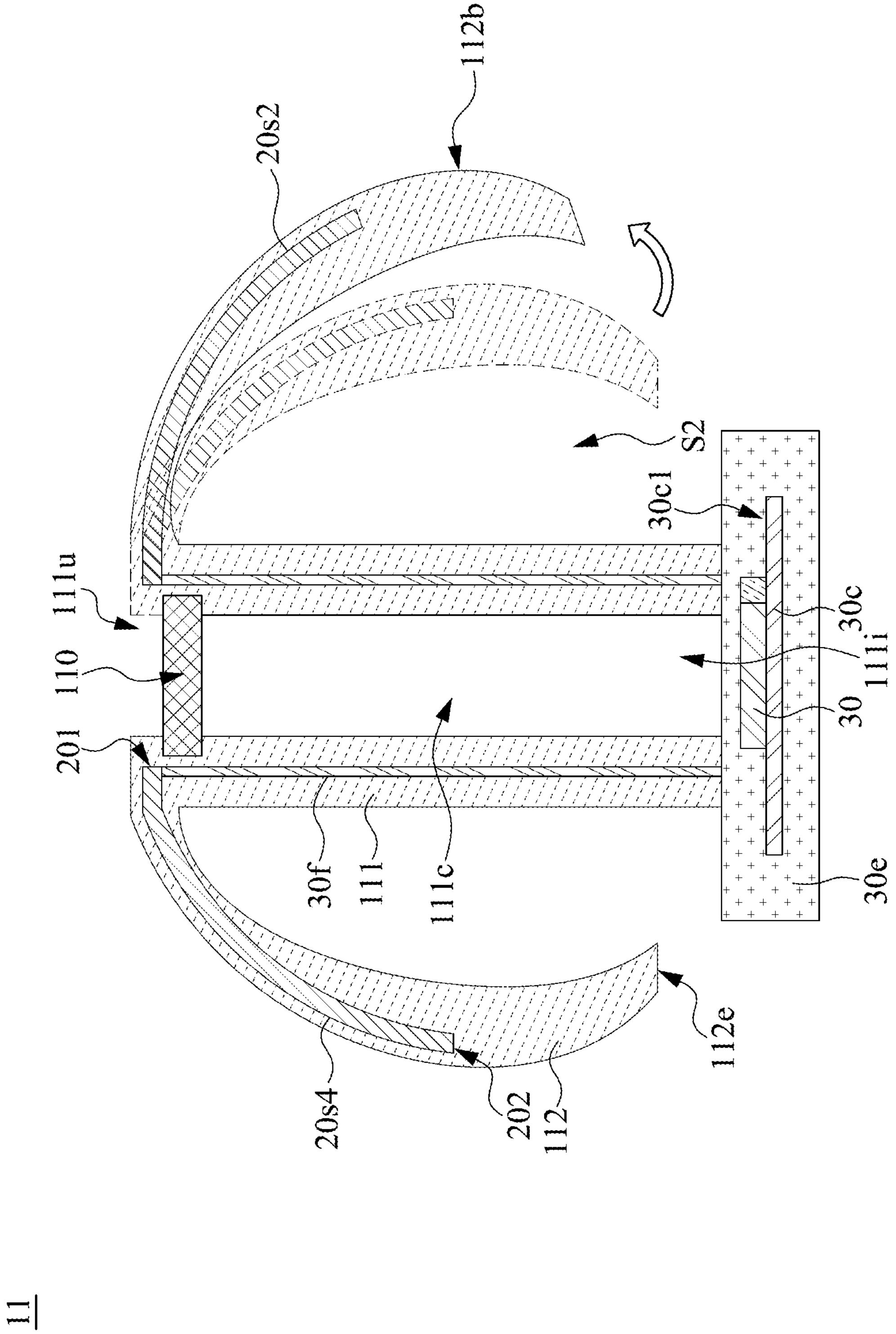
FIG. 3C illustrates a cross-sectional view of an electronic device in accordance with some arrangements of the present disclosure.
Figure 3D:
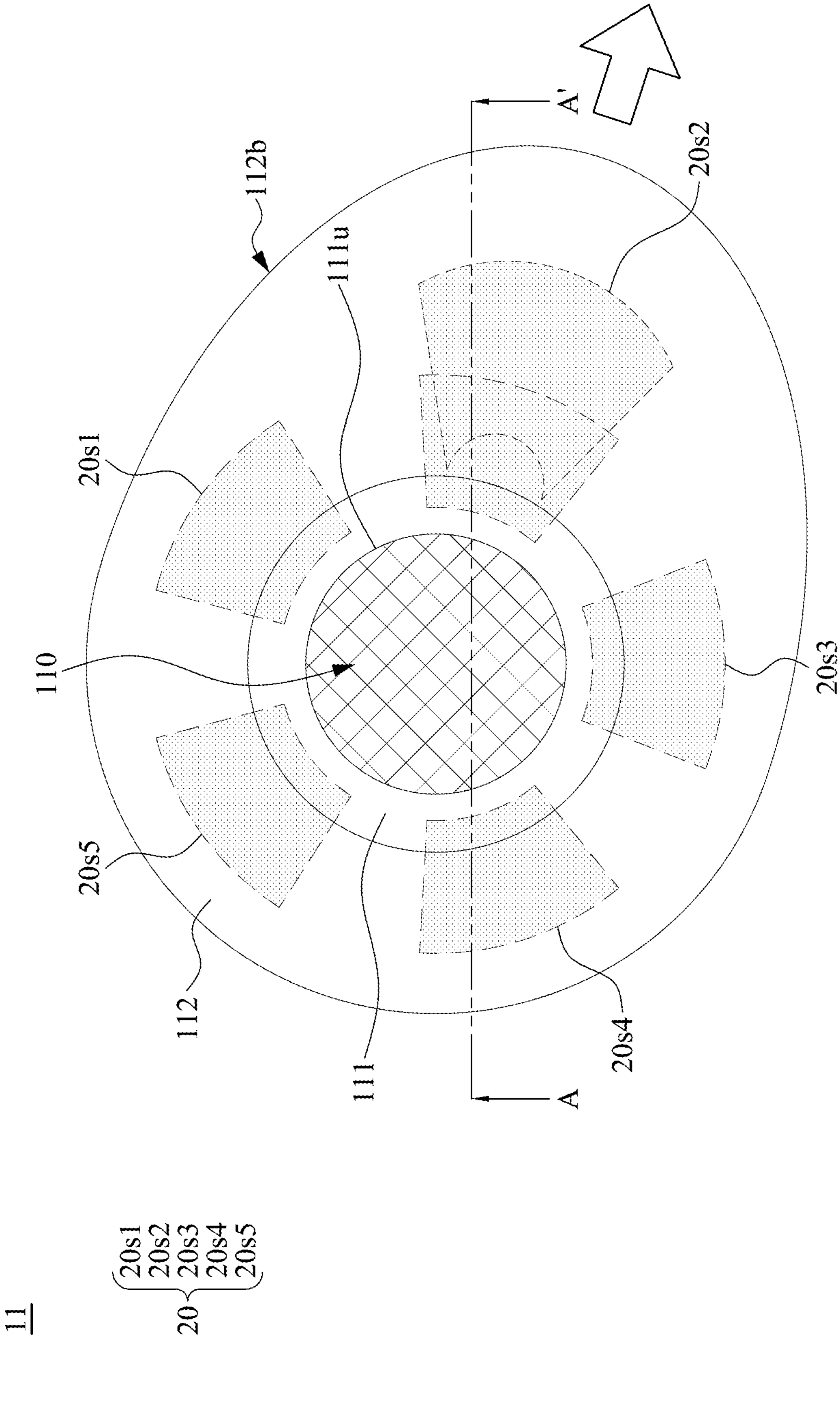
FIG. 3D illustrates a top view of an electronic device in accordance with some arrangements of the present disclosure.

FIG. 3C and FIG. 3D illustrate a cross-sectional view and a top view of an electronic device in accordance with some arrangements of the present disclosure. The ear tip 11 in FIG. 3C and FIG. 3D may be a configuration of the ear tip 11 in FIG. 2A and FIG. 3A after the deformable element 20 is deformed and causes (or affects) the ear interface portion 112 to move.

In FIG. 3D, at least two of the sections 20*s*1, 20*s*2, 20*s*3, 20*s*4, and 20*s*5 of the deformable element 20 are geometrically distinct from each other. For example, at least two of the sections 20*s*1, 20*s*2, 20*s*3, 20*s*4, and 20*s*5 of the deformable element 20 have different sizes and/or shapes. For example, at least two of the sections 20*s*1, 20*s*2, 20*s*3, 20*s*4, and 20*s*5 of the deformable element 20 have different outlines. For example, a voltage may be applied on the section 20*s*2 to deform the section 20*s*2. The section 20*s*2 may be geometrically distinct from the other sections of the deformable element 20. In FIG. 3C, the section 20*s*2 may be moved away from the body portion 111 and the outermost boundary 112*b* of the ear interface portion 112 may be expanded outward. The space S2 between the ear interface portion 112 and the body portion 111 may be enlarged.

In a comparative arrangement, to enable an electronic device (such as an in-ear audio device or an intra-aural audio device) to be used with ears of different sizes and shapes, one solution is to provide a range of ear tips of different shapes and/or sizes from which the user can choose. Despite the known solutions, there is still a need for providing a proper fit with a user's ear canal, so as to provide active noise cancellation (ANC) and enhance acoustic performance when the electronic device is comfortably in place.

By providing the deformable element 20 in the ear interface portion 112 to allow automatic deformation or manual deformation of the ear interface portion 112, the size and/or the shape of the ear interface portion 112 can be adjusted and modified to provide a proper fit with a user's ear canal automatically or manually after the electronic device is manufactured. For example, the size and/or the shape of the ear interface portion 112 can be adjusted and modified automatically or manually to be held against the user's ear canal without impairing movement or causing discomfort. In addition, the ear interface portion 112 may form a desired degree of sealing (or degree of compliance) with the user's ear canal, which in turn can improve convergence speed and improve noise cancellation (ANC) performance. Therefore, the desired acoustic performance can be achieved and the user experience can be enhanced.

The number of the sections of the deformable element 20 may be 2, 3, 4, 5, 6, 7, 8, or more. More sections of the deformable element 20 allow a more accurate control over the deformation of the ear interface portion 112. For example, the ear interface portion 112 may be expanded or contracted along different directions. For example, the ear interface portion 112 may be expanded or contracted along multiple directions.

For example, the sections 20*s*1, 20*s*2, 20*s*3, 20*s*4, and 20*s*5 of the deformable element 20 may each be controlled independently. For example, the sections 20*s*1, 20*s*2, 20*s*3, 20*s*4, and 20*s*5 of the deformable element 20 may each be configured to receive a signal (which may include a controlling signal from an electronic component 30 or an instruction from a user) and deform independently. Therefore, the types (such as extension, compression, depression, projection, shear, bending, twisting, etc.), orientations, directions, and degrees of deformation of the deformable element 20 may be controlled more accurately.

Figure 4A:
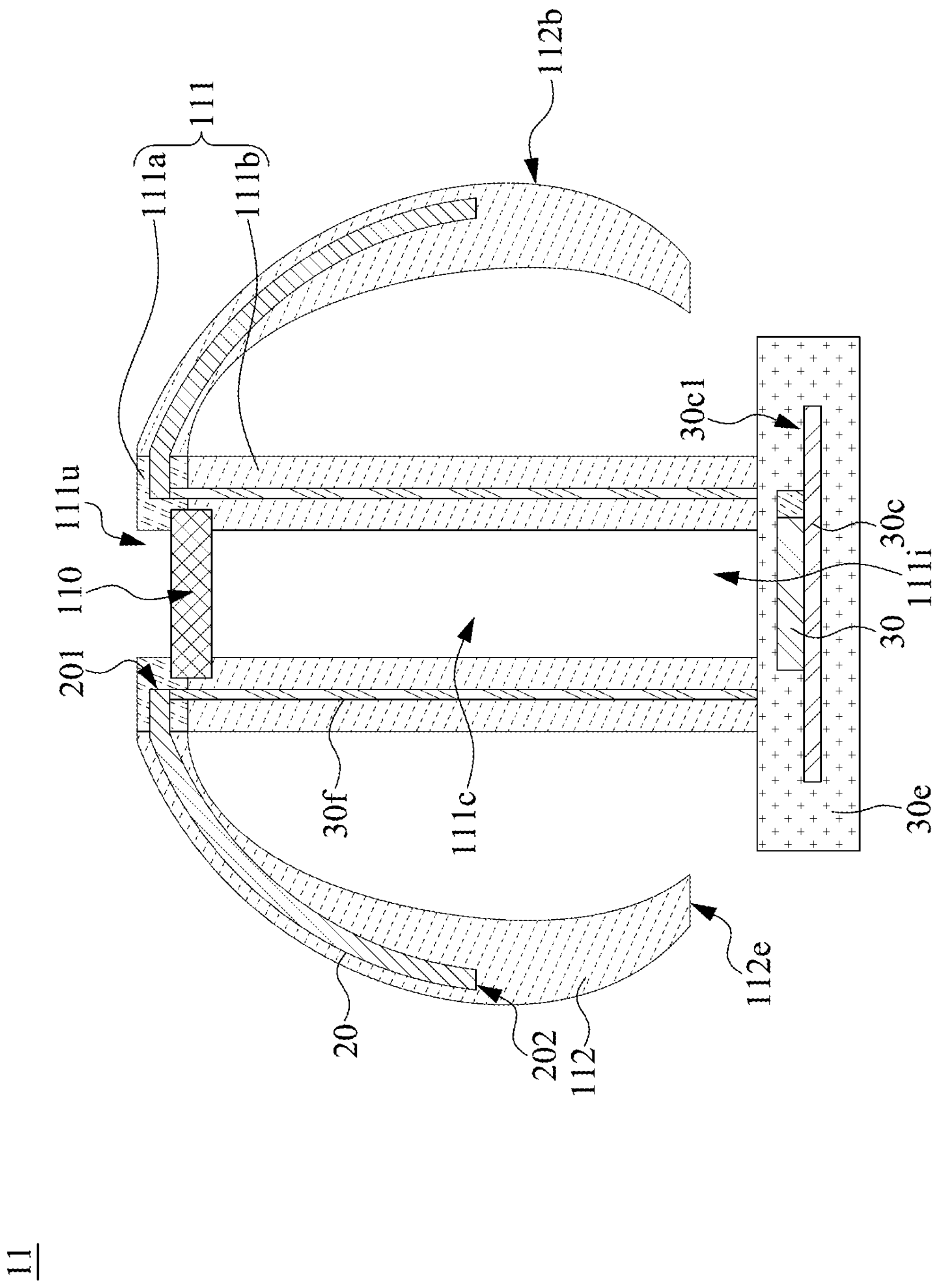
FIG. 4A illustrates a cross-sectional view of an electronic device in accordance with some arrangements of the present disclosure.

FIG. 4A illustrates a cross-sectional view of an electronic device in accordance with some arrangements of the present disclosure. The ear tip 11 in FIG. 4A is similar to the ear tip 11 in FIG. 3A except that the body portion 111 includes a portion 111*a* connected with the ear interface portion 112 and a portion 111*b* connected with the portion 111*a*. The portion 111*a* may be connected between the ear interface portion 112 and the portion 111*b*. The portion 111*a* may cover or encapsulate the end 201 of the deformable element 20.

The portion 111*b* and the ear interface portion 112 may include the same material. The portion 111*b* and the ear interface portion 112 may share the same characteristic or property. For example, the portion 111*b* and the ear interface portion 112 may have substantially the same elasticity, ductility, and/or malleability.

The portion 111*a* may have a different characteristic or property from that of the portion 111*b*. For example, the portion 111*b* may be softer than the portion 111*a*. The elasticity of the portion 111*b* may be greater than that of the portion 111*a*. The ductility of the portion 111*b* may be greater than that of the portion 111*a*. The malleability of the portion 111*b* may be greater than that of the portion 111*a*.

For example, the portion 111*a* may be harder than the portion 111*b*. The hardness of the portion 111*a* may be greater than that of the portion 111*b*. The ductility of the portion 111*a* may be less than that of the portion 111*b*. The malleability of the portion 111*a* may be less than that of the portion 111*b*. The portion 111*a* may include rubber, such as thermoset rubber or hard rubber, or other hard materials. In some arrangements, the portion 111*a* may be or include, silicon (Si), glass or other suitable materials. The portion 111*a* and the portion 111*b* may be formed using a two-shot molding process.

The portion 111*a* may restrict or limit the deformation of the deformable element 20. For example, the end 202 of the deformable element 20 may be a relatively free end (or an end that can be deformed more easily) and the end 201 of the deformable element 20 may be a relatively fixed end (or an end that is harder to be deformed). Therefore, the end 202 of the deformable element 20 may be deformed to allow a more accurate control over the deformation of the ear interface portion 112 while the end 201 of the deformable element 20 is substantially fixed. The overall shape and appearance of the eartip 11 and the cover 110 can be maintained by the portion 111*a* so that the ventilation of the acoustic channel 111*c* is unchanged (e.g., the transmission of the audio signals (or sound waves) and air waves through the plurality of openings of the cover 110 is not adversely affected), while at the same time, the ear interface portion 112 can be moved to fit with a user's ear canal.

In some arrangements, the portion 111*a* may include the top end of the body portion 111, as shown in FIG. 4A. In some arrangements, the portion 111*a* may be spaced apart from the top end of the body portion 111 to improve wearing comfort. For example, the portion 111*a* may cover the end 202 of the deformable element 20 and the portion 111*b* (or another flexible element) may cover the portion 111*a*.

Figure 4B:
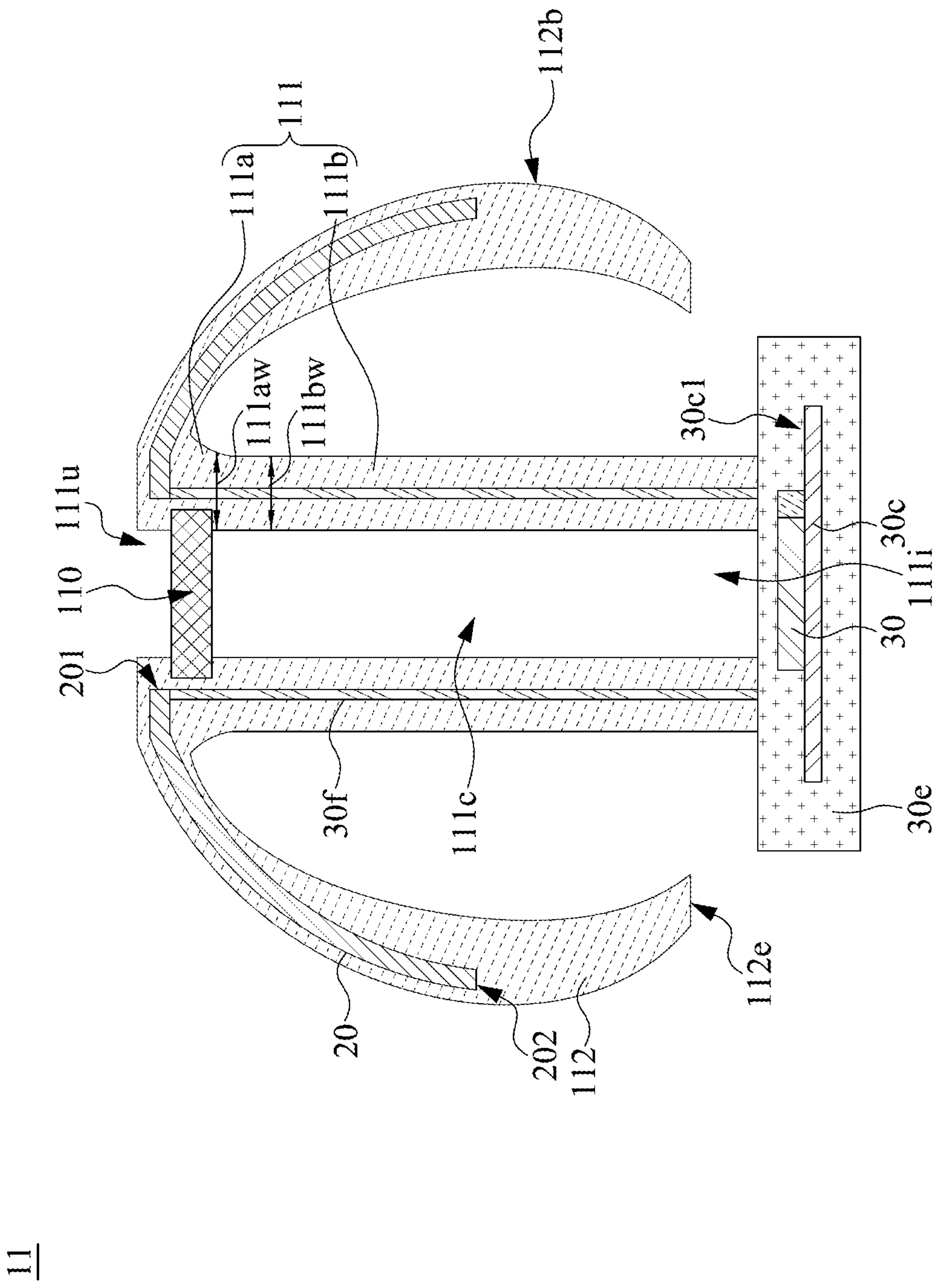
FIG. 4B illustrates a cross-sectional view of an electronic device in accordance with some arrangements of the present disclosure.

FIG. 4B illustrates a cross-sectional view of an electronic device in accordance with some arrangements of the present disclosure. The ear tip 11 in FIG. 4B is similar to the ear tip 11 in FIG. 4A except that a width 111*aw* of the portion 111*a* is greater than a width 111*bw* of the portion 111*b*. The portion 111*a* and the portion 111*b* may include the same material. In some arrangements, the portion 111*a* and the portion 111*b* may include different materials, as shown in FIG. 4A. The overall shape and appearance of the eartip 11 and the cover 110 can be maintained by the portion 111*a* so that the ventilation of the acoustic channel 111*c* is unchanged (e.g., the transmission of the audio signals (or sound waves) and air waves through the plurality of openings of the cover 110 is not adversely affected), while at the same time, the ear interface portion 112 can be moved to fit with a user's ear canal.

Similar to FIG. 4A, the portion 111*a* having a greater width may restrict or limit the deformation of the deformable element 20. Therefore, the end 202 of the deformable element 20 may be deformed to allow a more accurate control over the deformation of the ear interface portion 112 while the end 201 of the deformable element 20 is substantially fixed.

Figure 4C:
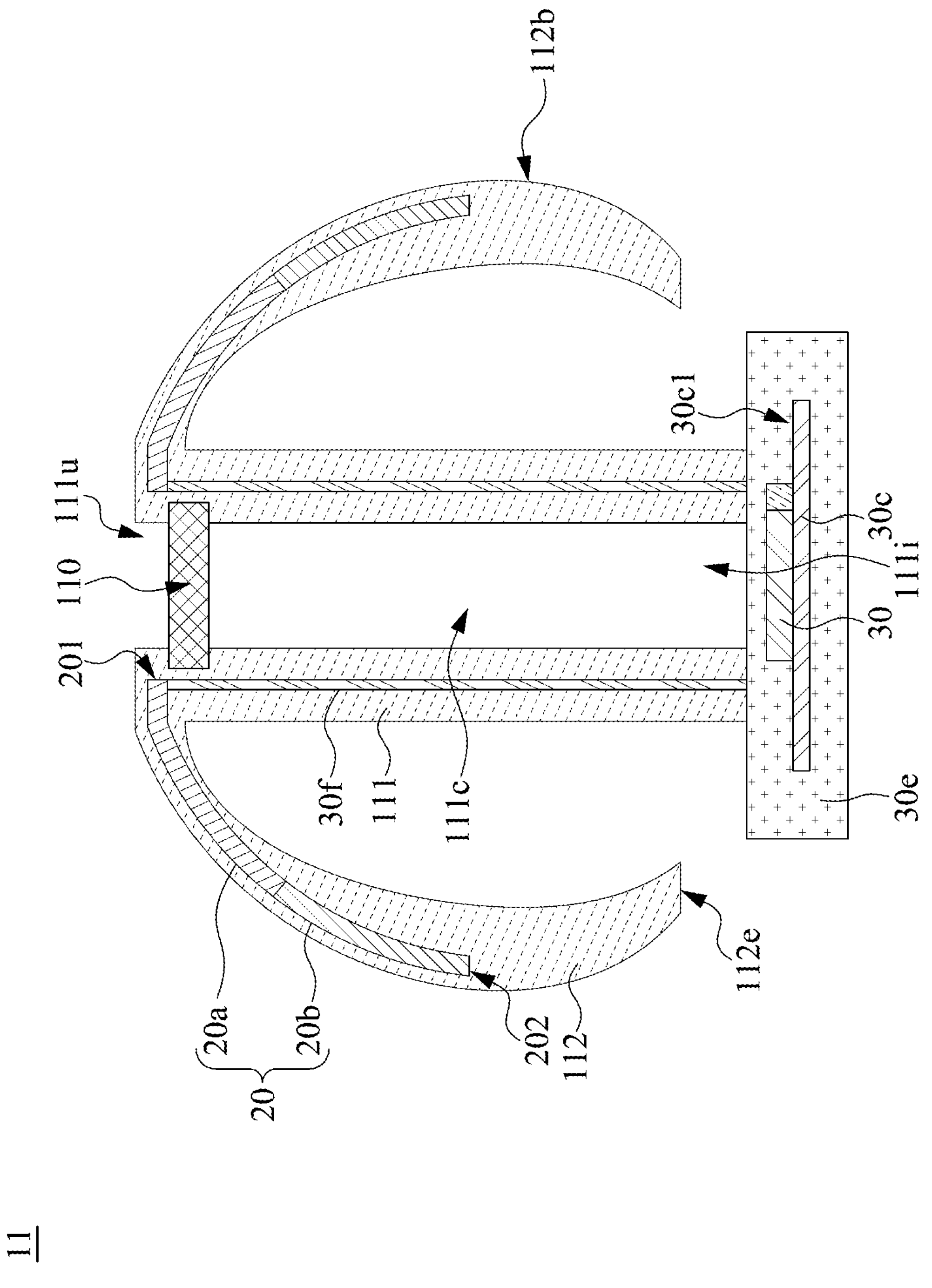
FIG. 4C illustrates a cross-sectional view of an electronic device in accordance with some arrangements of the present disclosure.

FIG. 4C illustrates a cross-sectional view of an electronic device in accordance with some arrangements of the present disclosure. The ear tip 11 in FIG. 4C is similar to the ear tip 11 in FIG. 3A except that the deformable element 20 includes a portion 20*a* and a portion 20*b* connected with the portion 20*a*. The portion 20*a* is disposed closer to the top end of the body portion 111 or the acoustic output portion 111*u* than the portion 20*b* is. The portion 20*b* is disposed closer to the end 112*e* of the ear interface portion 112 than the portion 20*a* is.

The portion 20*a* may have a different characteristic or property from that of the portion 20*b*. For example, the portion 20*b* may be softer than the portion 20*a*. The elasticity of the portion 20*b* may be greater than that of the portion 20*a*. The ductility of the portion 20*b* may be greater than that of the portion 20*a*. The malleability of the portion 20*b* may be greater than that of the portion 20*a*.

For example, the portion 20*a* may be harder than the portion 20*b*. The hardness of the portion 20*a* may be greater than that of the portion 20*b*. The portion 20*a* and the portion 20*b* of the deformable element 20 may each include a piezoelectric material, which may be crystalline, ceramic, or polymeric. In some arrangements, the degree of deformation of the portion 20*b* may be greater than the degree of deformation of the portion 20*a*. The reaction of the portion 20*b* may be greater than the reaction of the portion 20*a* with respect to the voltage applied across the deformable element 20.

The end 202 of the deformable element 20 may be a relatively free end (or an end that can be deformed more easily) and the end 201 of the deformable element 20 may be a relatively fixed end (or an end that is harder to be deformed). Therefore, the end 202 of the deformable element 20 may be deformed to allow a more accurate control over the deformation of the ear interface portion 112 while the end 201 of the deformable element 20 is substantially fixed.

Figure 4D:
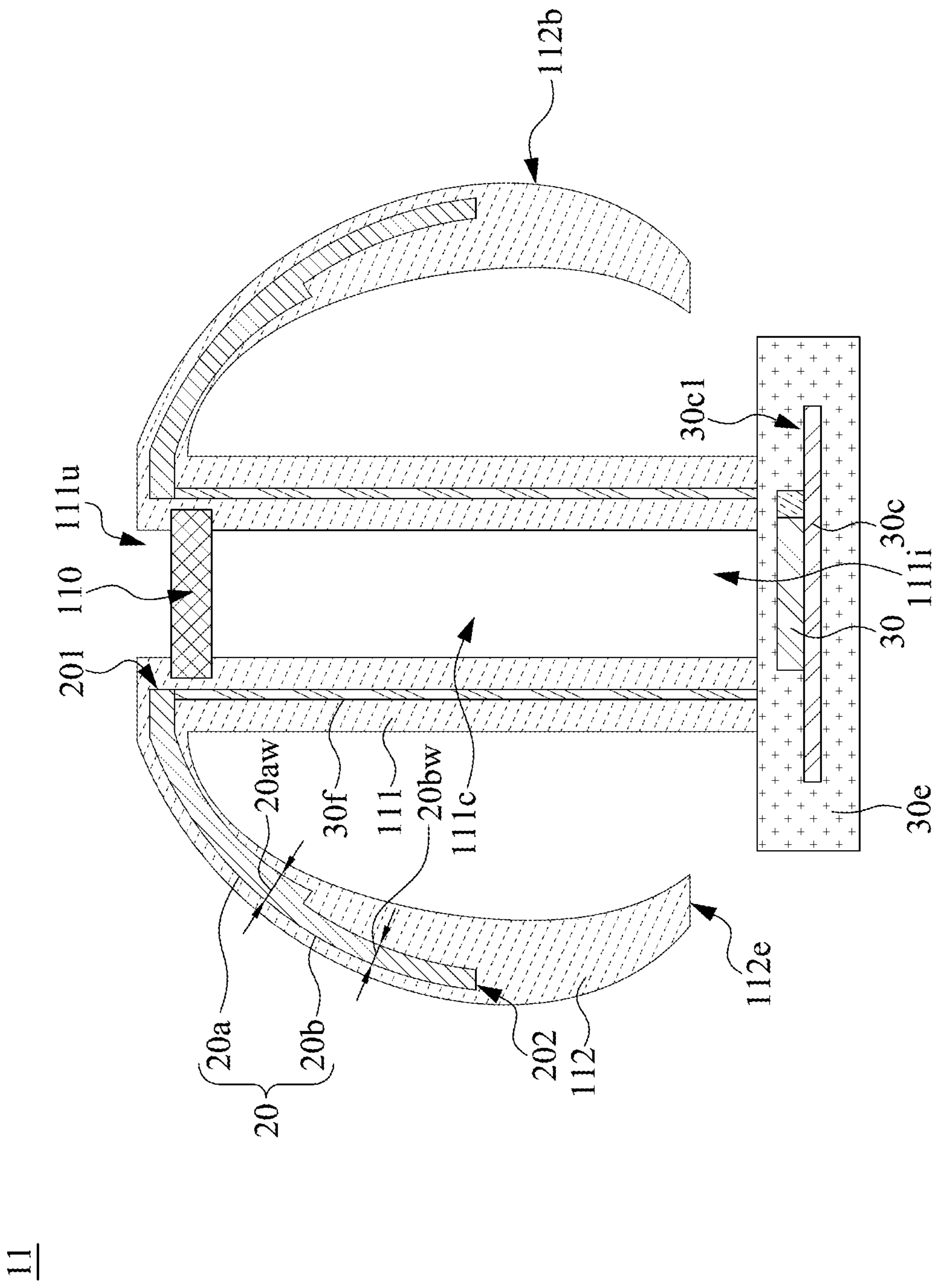
FIG. 4D illustrates a cross-sectional view of an electronic device in accordance with some arrangements of the present disclosure.

FIG. 4D illustrates a cross-sectional view of an electronic device in accordance with some arrangements of the present disclosure. The ear tip 11 in FIG. 4D is similar to the ear tip 11 in FIG. 4C except that a width 20*aw* of the portion 20*a* is greater than a width 20*bw* of the portion 20*b*. The portion 20*a* and the portion 20*b* may include the same material. In some arrangements, the portion 20*a* and the portion 20*b* may include different materials, as shown in FIG. 4C.

Similar to FIG. 4C, the end 202 of the deformable element 20 may be a relatively free end. Therefore, the end 202 of the deformable element 20 may be deformed to allow a more accurate control over the deformation of the ear interface portion 112 while the end 201 of the deformable element 20 is substantially fixed.

Figure 5A:
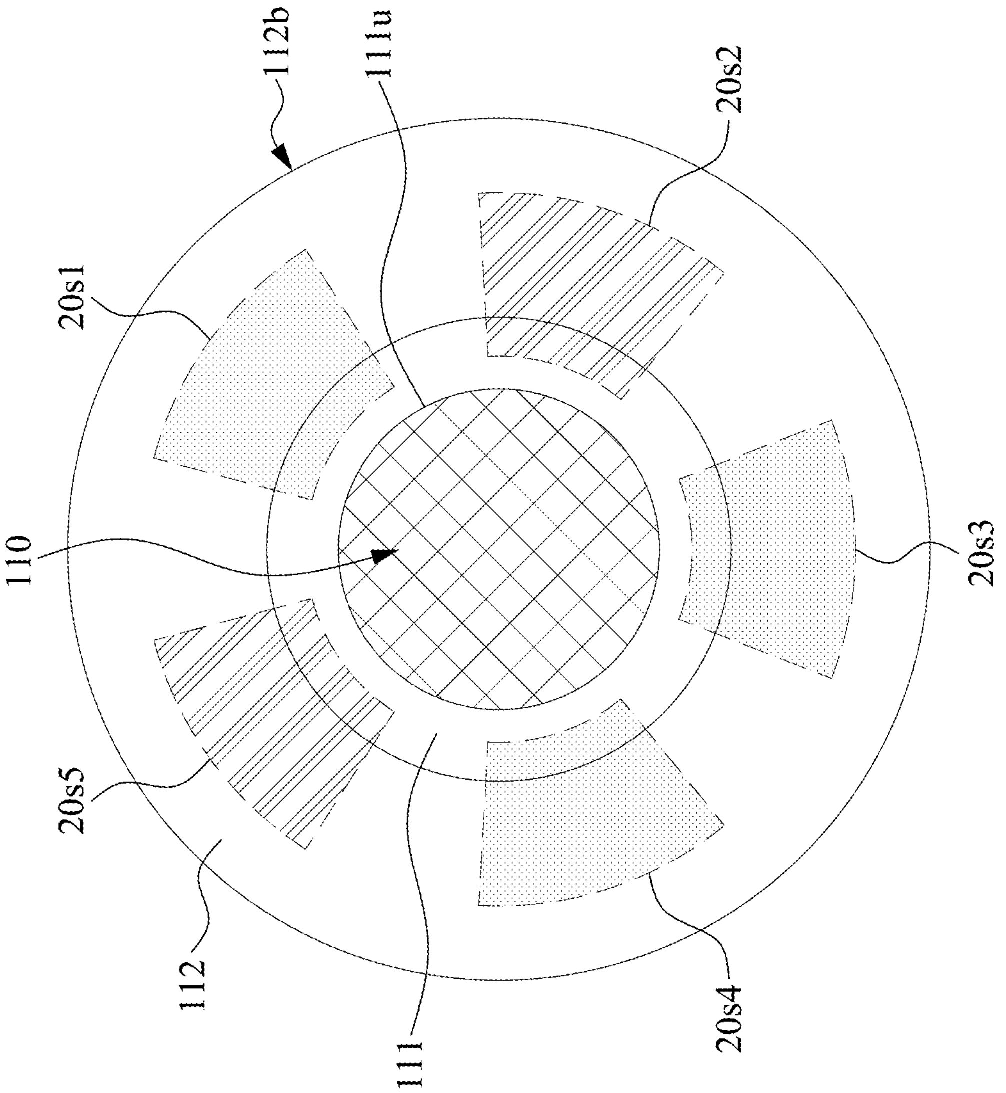
FIG. 5A illustrates a top view of an electronic device in accordance with some arrangements of the present disclosure.

FIG. 5A illustrates a top view of an electronic device in accordance with some arrangements of the present disclosure. In some arrangements, the ear tip 11 of the electronic device 1 in FIG. 1 may have a top view in FIG. 5A. The ear tip 11 in FIG. 5A is similar to the ear tip 11 in FIG. 2A except for the differences described as follows.

At least one of the sections 20*s*1, 20*s*2, 20*s*3, 20*s*4, and 20*s*5 of the deformable element 20 includes a sensing element or a detection element. For example, the sections 20*s*2 and 20*s*5 may generate a signal as an indication of the degree of sealing between the ear interface portion 112 and the user's ear canal. For example, the sections 20*s*2 and 20*s*5 include a piezoelectric material and may generate an electric charge in response to an applied mechanical stress, such as the force from the user's ear canal when the ear interface portion 112 is expanded to press against the user's ear canal.

The electronic component 30 may be configured to use the signal from the sections 20*s*2 and 20*s*5 as feedback to control the deformation of the deformable element 20 automatically.

For example, the feedback process may include at least the following stages (or steps). The first stage involves the electronic component 30 generating a signal (a first signal, such as a voltage) to the sections 20*s*1, 20*s*3, and 20*s*4 to expand the ear interface portion 112. The sections 20*s*2 and 20*s*5 may contact or press against the user's ear canal.

The second stage involves the sections 20*s*2 and 20*s*5 generating a signal (a second signal, such as a voltage) to the electronic component 30 as an indication of the degree of sealing between the ear interface portion 112 and the user's ear canal.

The third stage involves the electronic component 30 using the signal from the sections 20*s*2 and 20*s*5 as feedback to determine if a desired degree of sealing is achieved.

The fourth stage involves the electronic component 30 generating a signal (a third signal, such as a voltage) to the sections 20*s*1, 20*s*3, and 20*s*4 based on the determination. In some arrangements, the third signal may include a sign opposite to the sign of the first signal to adjust the deformation. Opposite signs may include positive and negative signs. In some arrangements, the third signal may include an order to cease the deformation of the sections 20*s*1, 20*s*3, and 20*s*4.

The process may repeat until a desired degree of sealing between the ear interface portion 112 and the user's ear canal is achieved. No limitation is intended to be placed on the sequence, timing, duration and priority of the steps. For example, the process may start from the second stage.

The positions, functions, and number of the sections **20*s*1, 20*s*2, 20*s*3, 20*s*4, and 20*s*5 of the deformable element 20 in the ear tip 11 are not intended to limit the present disclosure. For example, any number of sections can be used to provide feedback, depending on design requirements. For example, the sections 20*s*1, 20*s*2, 20*s*3, 20*s*4, and 20*s*5 of the deformable element 20 may each be configured to provide feedback. For example, the sections 20*s*1, 20*s*2, 20*s*3, 20*s*4, and 20*s*5 of the deformable element 20 may each be configured to be deformed to contact or press against the user's ear canal and generate a signal to the electronic component 30. For example, the sections 20*s*1, 20*s*2, 20*s*3, 20*s*4, and 20*s*5 of the deformable element 20 may each be configured to partially deform the deformable element 20 and generate a feedback signal. For example, the sections 20*s*1, 20*s*2, 20*s*3, 20*s*4, and 20*s*5 of the deformable element 20 may each be configured to be multi-functional. For example, the sections used to provide feedback can be evenly or equally spaced to allow a more accurate control over the deformation of the deformable element 20**.

Figure 5B:
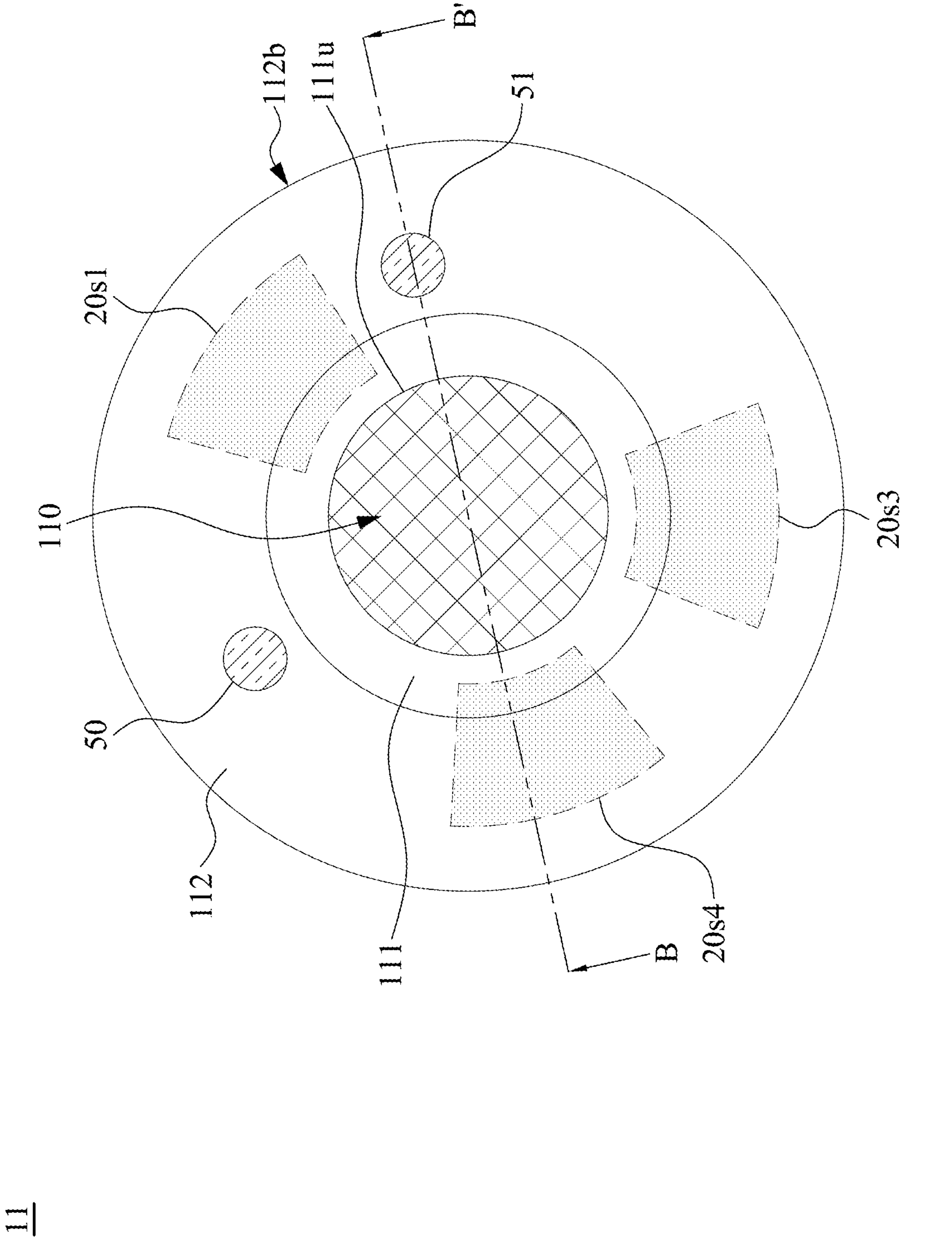
FIG. 5B illustrates a top view of an electronic device in accordance with some arrangements of the present disclosure.

FIG. 5B illustrates a top view of an electronic device in accordance with some arrangements of the present disclosure. In some arrangements, the ear tip 11 of the electronic device 1 in FIG. 1 may have a top view in FIG. 5B. The ear tip 11 in FIG. 5B is similar to the ear tip 11 in FIG. 5A except that the sections **20*s*2 and 20*s*5 are replaced with sensing elements 50 and 51**.

In some arrangements, the sensing elements 50 and 51 may each be an electrode, a thermistor, a pressure sensor, a proximity sensor, a motion sensor, an acoustic sensor, a smell sensor, a particle sensor, a humidity sensor, an optical transmitter, an optical receiver, an optical transceiver, or a combination thereof.

In some arrangements, the sensing elements 50 and 51 may each be used to detect or collect one or more signals or information external to the ear tip 11. For example, the sensing elements 50 and 51 may be used to detect temperature, air pressure, smells, particles, sound, light, humidity, or other environmental variables. For example, the sensing elements 50 and 51 may be used to generate a signal which is indicative of an environmental variable.

In some arrangements, the electronic component 30 may be configured to use the signal from the sensing elements 50 and 51 as feedback to control the deformation of the deformable element 20 automatically.

In some arrangements, the ear tip 11 may include the sensing elements 50 and 51 (to generate a signal as an indication of environmental variables) and sensing sections (such as the sections **20*s*2 and 20*s*5 in FIG. 5A) to generate a signal as an indication of the degree of sealing between the ear interface portion 112 and the user's ear canal. The signals from the sensing elements 50 and 51 and the signals from the sensing sections (such as the sections 20*s*2 and 20*s*5 in FIG. 5A) may be used as feedback for the electronic component 30 to control the deformation of the deformable element 20** automatically.

Figure 5C:
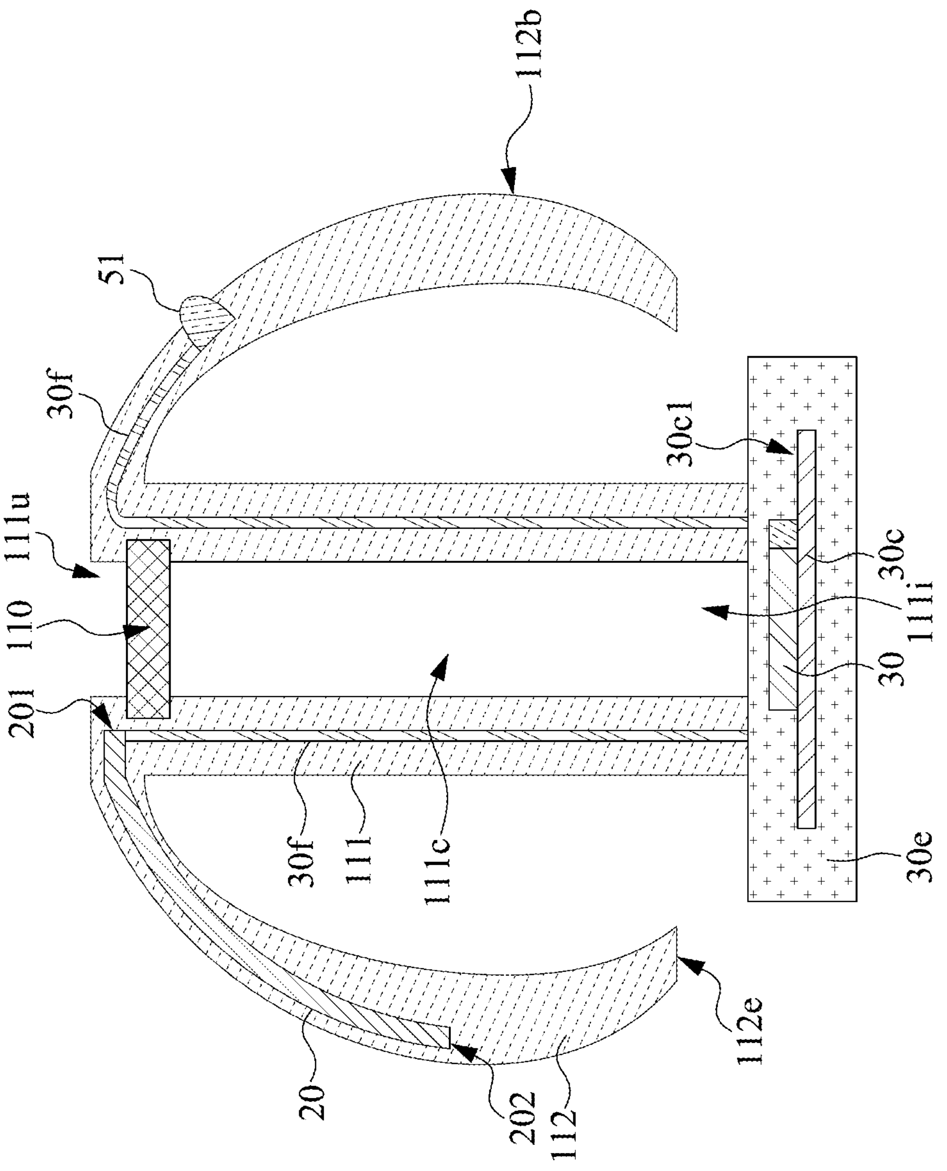
FIG. 5C illustrates a cross-sectional view of an electronic device in accordance with some arrangements of the present disclosure.

FIG. 5C illustrates a cross-sectional view of an electronic device in accordance with some arrangements of the present disclosure. In some arrangements, the ear tip 11 of the electronic device 1 in FIG. 1 may have a cross-sectional view in FIG. 5C. In some arrangements, the cross-sectional view in FIG. 5C may be a cross-sectional view of the ear tip 11 in FIG. 5B along the line BB'.

The sensing element 51 may be partially exposed from the ear interface portion 112. In some arrangements, the sensing element 51 may be partially surrounded, embedded, or covered by the ear interface portion 112. However, in some arrangements, the sensing element 51 may be entirely embedded in the ear interface portion 112.

FIG. 6 illustrates a side view of the electronic device 1 being worn on an ear in accordance with some arrangements of the present disclosure.

When the electronic device 1 is worn by a user, the deformable element 20 may be deformed (e.g., exhibit a change in the size and/or the shape), and the size and/or the shape of the ear interface portion 112 follows the size and/or the shape of the deformable element 20 to compliant with (or conform to, seal against) the user's ear canal. For example, the ear interface portion 112 may separate a space (or an internal space or a first space) S1 of the user's ear canal from a space (or a second space) S2 between the ear interface portion 112 and the body portion 111. Since the space S2 is predefined between the ear interface portion 112 and the body portion 111, the ear interface portion 112 can be deformed while being comfortably in place.

As used herein, the singular terms "a," "an," and "the" may include a plurality of referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1, less than or equal to ±0.5°, less than or equal to ±0.10, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific arrangement thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other arrangement of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

PARTS LIST

1 electronic device
10 housing
10*p* opening
11 ear tip
110 cover
111 body portion
111*a* portion
111*aw* width
111*b* portion
111*bw* width
111*c* opening
111*i* acoustic input portion
111*u* acoustic output portion
112 ear interface portion
112*b* outermost boundary
112*e* end
20 deformable element
201 end
202 end
20*a* portion
20*aw* width
20*b* portion
20*bw* width
20*s*1 section
20*s*2 section
20*s*3 section
20*s*4 section
20*s*5 section
21 deformable element
30 electronic component
30*c* carrier
30*cl* surface
30*e* encapsulation layer
30*f* flexible connection element
50 sensing element
51 sensing element
AA' line
BB' line
S1 space
S2 space

What is claimed is:

1. A electronic device, comprising:

a deformable element configured to generate a first signal to an electronic component, to receive a second signal from the electronic component, and to deform an ear interface portion of the electronic device based on the second signal, wherein the first signal comprises an indication of a degree of sealing between the ear interface portion and a user's ear canal when the electronic device is worn by the user.

2. The electronic device of claim 1, wherein the deformable element comprises a first section configured to generate the first signal and a second section configured to receive the second signal from the electronic component.

3. The electronic device of claim 1, further comprising: a sensing element disposed over the ear interface portion.

* * * * *